May 27, 1930.                V. E. HOFMANN                1,760,499
             METHOD OF AND APPARATUS FOR DRAWING SHEET GLASS
                      Filed Jan. 25, 1929         2 Sheets-Sheet 2
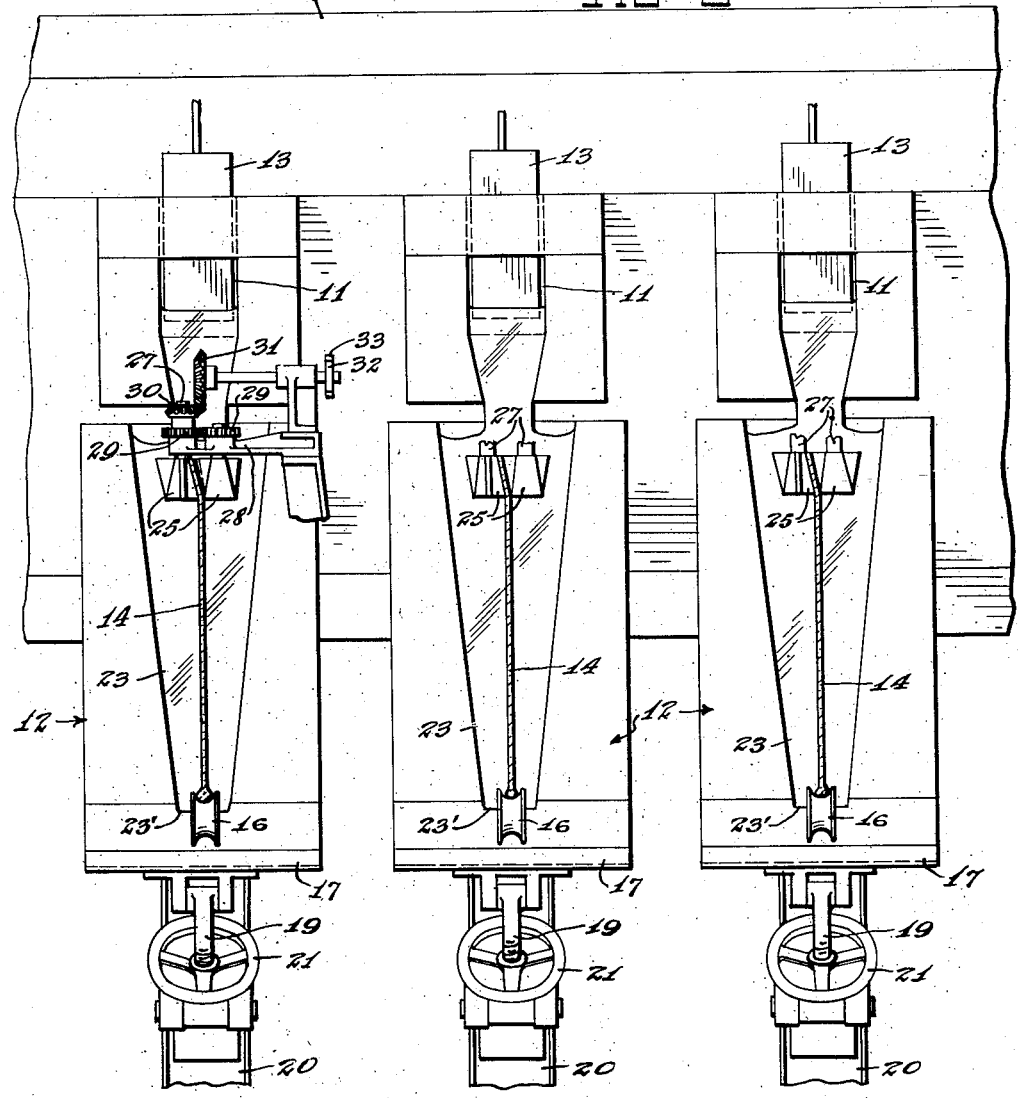
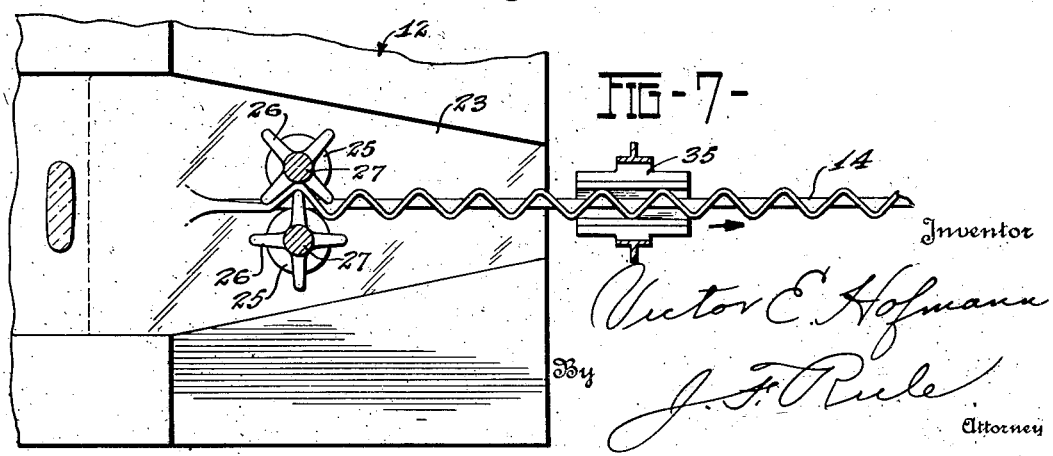

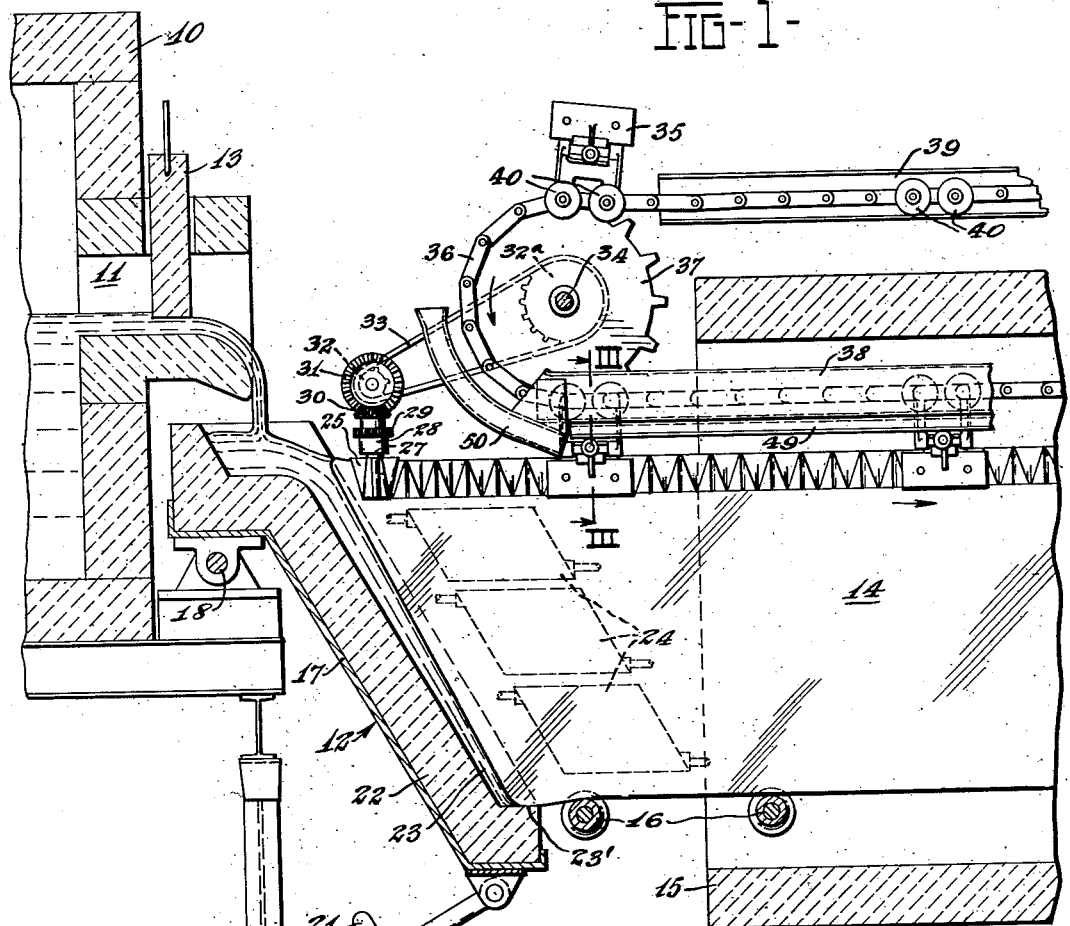
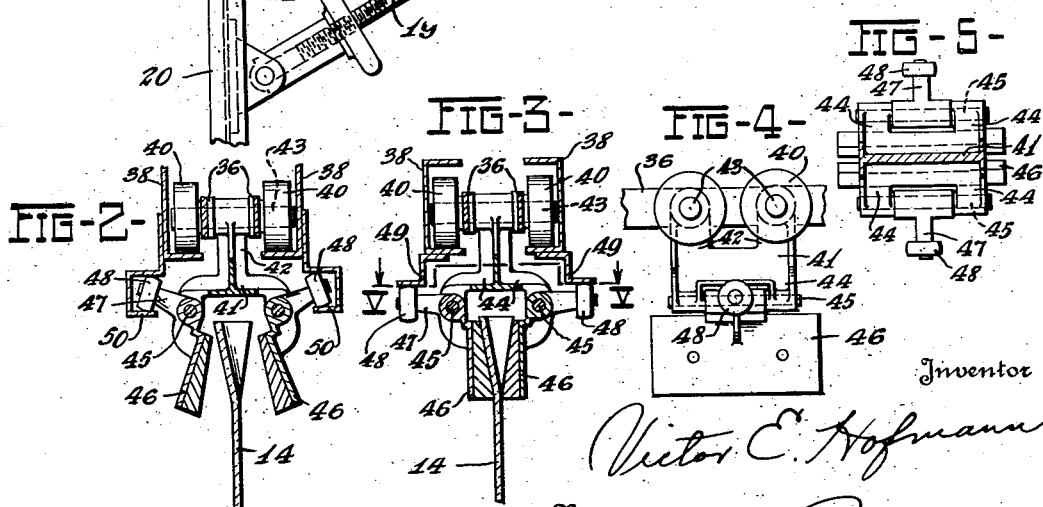

Patented May 27, 1930

1,760,499

UNITED STATES PATENT OFFICE

VICTOR E. HOFMANN, OF TOLEDO, OHIO

METHOD OF AND APPARATUS FOR DRAWING SHEET GLASS

Application filed January 25, 1929. Serial No. 334,982.

My invention relates to improvements in methods of and apparatus for drawing sheet glass and more particularly to that type of apparatus in which the molten glass flows by gravity from a supply body in the melting tank or furnace to the point from which the sheet is drawn.

In the manufacture of sheet glass in accordance with the usual methods, the sheets are continuously drawn from a supply body of molten glass, the path of travel of the drawn sheet extending vertically upward or downward from the supply body and thence over and between a series of rollers which give the sheet a predetermined width and thickness just prior to entry into an annealing leer. Contact between the glass sheet and the rollers is considered partly responsible for certain defects in the sheet. Bending of the sheet as is customary is also considered to have a detrimental effect upon the sheet of glass.

It is also customary to anneal the sheets of glass by carrying them thru annealing leers individual to the sheets and supporting them on rollers or the like elements while being annealed. These rollers or other supporting means contact with one face of the sheet being annealed. It is considered that this method of carrying the sheet thru the leer also results in scratching or otherwise marring the glass so that its quality is below standard. Also, the fact that a leer may at present accommodate only a single sheet of glass at a time materially increases the cost of annealing.

An object of the present invention is to provide an improved method of and apparatus for drawing sheet glass in which only a relatively small area of the sheet comes in contact with any part of the forming or drawing apparatus and in which the sheet is not rolled or bent in any manner whatsoever. To this end there is provided means to draw the sheet on edge from a drawing trough and carry the sheet in a straight line from said trough thru the annealing leer to the point at which said sheet is severed into sections of predetermined size.

Another object is to provide means whereby a single annealing leer may be utilized to anneal a plurality of continuous sheets of glass simultaneously. To this end the apparatus includes the positioning of a series of drawing troughs in proximity to one end of the leer so that a number of sheets of glass may be drawn horizontally and on edge and carried into and thru the leer for annealing.

Other objects will be apparent hereinafter.

In the drawings:

Fig. 1 is a sectional elevation of the sheet forming apparatus.

Figs. 2 to 5 inclusive are detail views of the sheet drawing and supporting clamps.

Fig. 2 is a detail sectional view showing the clamping jaws open.

Fig. 3 is a sectional view along the line III—III of Fig. 1 showing the clamping jaws supporting the sheet.

Fig. 4 is a detail side elevation of one of the clamps.

Fig. 5 is a sectional view taken along the line V—V of Fig. 3.

Fig. 6 is a vertical transverse sectional view looking toward the troughs from which the sheets of glass are drawn.

Fig. 7 is a plan view with parts in section showing in detail the upper edge view of the sheet and manner in which it is shaped preparatory to being gripped by the supporting and drawing clamps.

In the drawings which illustrate one embodiment of my invention the feeding end of the furnace or melting tank 10 is provided with one or more outlet openings 11 thru which molten glass flows by gravity to a series of drawing troughs 12. The rate of flow of the glass thru the openings 11 may be controlled by blocks or gates 13 which extend across the outlet openings 11 and are adjustable vertically. The sheets 14 are drawn from the troughs 12 substantially horizontally and on edge between cooling tanks 24 or the like directly into an annealing leer 15.

Each drawing trough 12 includes a supporting frame 17 whose upper end is fulcrumed upon a horizontal hinge pin 18 extending at right angles to the direction of flow of the glass. A liner 22 of firebrick or similar material is arranged in the frame 17 and provided with a channel 23 in its outer face the walls of said channel converging downwardly. The rate of flow of glass in the channel and accumulation of glass at the lower end of the channel predetermine to a considerable degree the relative thickness of upper and lower portions of the sheet. Accordingly by converging the side walls of the channel as stated, excessive down flow of molten glass therein is in part controlled. To further control the rate of down flow of glass for the purpose set forth, the angle of inclination of the trough may be varied. Therefore, the lower end of the trough is connected thru an extensible connector 19 to a support 20 which may constitute a portion of the base upon which the tank or furnace 10 is mounted. This connector 19 includes sections telescoped one into the other and a hand wheel 21 threaded on one section. By rotating the hand wheel 21 the length of the connector 19 is changed and the frame 17 is thereby moved about the axis of the hinge pin 18. Thus the angle of inclination of the trough may be varied as required by the viscosity of the glass or for other reasons.

In drawing the sheet from the trough 12 the upper margin is crimped or otherwise deformed to provide a suitably shaped portion for engagement with the drawing and supporting clamps. In the present disclosure this is accomplished by means of a pair of star wheels 25 (Figs. 1, 6 and 7) whose radial arms 26 run in mesh with each other and thereby crimp the upper margin of the sheet which is drawn between the wheels. These star wheels are carried by pairs of vertical shafts 27 journaled by bearings 28 and carrying meshing gears 29. One of the shafts 27 is extended upwardly and carries a bevel gear 30 which meshes with a bevel gear 31 driven by a sprocket 32, a chain 33, and a sprocket 32ª on a shaft 34 which extends across the receiving end of the leer 15 and is associated with the sheet supporting and drawing devices as will be apparent presently.

The sheet drawing and supporting means which engages the sheet or sheets after the crimping operation consists of a series of clamps 35 or holders carried by an endless chain 36 which runs over a sprocket 37 secured to the shaft 34 at the front end of the leer 15. A similar chain support (not shown) may be provided at the other end of the leer. The lower reach of the chain 36 runs thru the leer tunnel between a pair of guide rails 38 which extend lengthwise of the leer in proximity to the lower side of the cover or roof thereof. The upper, or returning reach of the chain 36 also moves between guide rails 39 (Fig. 1) which are positioned above the leer. Groups of rollers 40 carried by the chain 36 at spaced points thereon run in the guide rails 38 in the leer to support the chain and clamps 35 in proper position relative to the sheet 14 of glass being drawn thru the leer.

The clamps 35 or drawing devices (Figs. 1 to 5) which are individual to the groups of rollers 40 include a hanger 41 formed with a pair of arms 42 extending upwardly and secured to cross pins 43 upon which the rollers 40 are journaled. The lower portions of each hanger (Fig. 3) includes arms 44 extending horizontally and at right angles to the length of the chain 36, the extremities of said arms carrying horizontal hinge pins 45 which extend parallel with said chain. A pair of clamping jaws 46 are pivoted to the hinge pins 45 and carry laterally extended arms 47 upon the outer ends of which cam rolls 48 are mounted. The opposed faces of the jaws 46 may be shaped to correspond to the form of the upper margin of the sheet.

The clamps are held in operative engagement with the crimped or otherwise deformed margin of the sheet or with the sheet immediately below said margin by cams 49 which extend lengthwise of the guide rails 38 and are supported thereby as shown in Figs. 1 and 3. These cams 49 operate thru the rolls 48 and arms 47 to hold the jaws 46 firmly against the sheet 14. Just before the clamps are to be attached to the upper margin of the sheet the jaws 46 are held open a predetermined extent by arcuate cams 50 (Figs. 1 and 2) which are mounted upon the forward ends of the guide rails.

The lower margin of the sheet 14 is prevented from sagging as it is drawn, by placing rollers 16 for contact with the sheet adjacent the drawing trough. These rollers engage the lower edge of the sheet and may form a rounded head thereon. Since the sheet cools and sets quickly, only a few of these rollers are necessary. The clamps 35 adequately support the sheet during a major portion of its travel thru the leer. If found desirable the rollers 16 may be replaced by drawing devices such as the clamps 35. Equal drawing tension on the upper and lower margins of the sheet would be thereby assured.

In operation, the molten glass flows in a continuous stream thru the outlet 11 from the melting tank 10 or furnace into the upper end of the drawing trough 12 and thence downwardly thru the tapered channel 23 to the horizontal ledge 23' at the lower end of said channel. Any well known or approved means may be employed to start the sheet drawing process. The upper margin of the sheet passes between the crimping wheels 25 for shaping prior to engagement with the clamps 35 which support the sheet against sagging and draw a sheet thru the leer tunnel in which it is annealed. Before the clamps come into engagement with the sheet the crimped or corrugated upper margin becomes more or less set in the shape created by the star wheels and shown in Fig. 7 so that the clamps 35 may operate quite effectively as a supporting medium for the sheet. Also the opposite faces of the sheet are considerably chilled and thereby properly set due to the cooling effect of the water jacket 24 heretofore referred to. The lower margin of the sheet 14 slides freely over the rollers 16 during movement into the leer 15.

As the sheet leaves the delivery end of the leer, the clamps 35 pass beyond the influence of the cams 49 so that an operator may cut and remove sections of the sheet from engagement with the clamps, it being understood that such removal is effected simply by swinging the arms 47 of the clamps upwardly and thereby move the jaws 46 out of contact with the sheet.

Varying conditions in the glass, such for example as changes in its fluidity, are in part compensated for in the present apparatus by changing the angle of inclination of the trough 12 so that the glass is evenly distributed as regards thickness thruout the width of the sheet being drawn from the trough. For example if the glass is extremely fluent and as a result flows too rapidly to the lower end of the trough 12, the lower portion of the sheet being drawn from said trough would ordinarily be considerably thicker than the upper portion. To overcome this objection the lower end of the trough must be adjusted outwardly toward the leer 15 to thereby decrease the angle of inclination of the trough and thereby proportionately reduce the rate of flow of glass to the lower end of the trough. Such adjustment will result in a reduction of the quantity of glass reaching the lower end of the trough and in the drawing of a sheet of uniform thickness. On the other hand if the glass is in such a viscous state that the lower portions of the sheet are below standard thickness, the trough 12 may be adjusted to increase its angle of inclination so that the glass flows more rapidly to the lower end of the trough and thereby increases the thickness of said lower portions of the sheet. Thus, it is seen that uniformity in the thickness of the sheet of glass being drawn from the trough may be obtained by adjusting the angle of the trough as required by the viscosity of the glass being worked. The thickness of the sheet may be determined by vertically adjusting the gate 13 to regulate the rate of flow of the molten glass from the furnace or melting tank 10 into the trough 12 and by increasing or decreasing the speed of travel of the drawing clamps 35.

For the greater part the foregoing description refers to the manner of drawing a single sheet of glass and carrying the same thru the annealing leer 15. It is to be understood that this same method applies to the series of troughs, shown for example in Fig. 6, and that a single leer may be utilized to anneal several such continuous sheets drawn from a single furnace. By drawing the sheets on edge as illustrated, or substantially so, it is possible to form sheet glass without defects such as are considered due to rolling and bending the sheets in the manner necessary in carrying out the usual methods. Also drawing the sheets on edge thru the leer effects considerable economy in annealing space since a single leer may well anneal quite a number of sheets of glass. By avoiding contact between a major portion of the area of the sheet and supporting means thruout drawing and annealing operations except at the upper and lower margins, scratching or otherwise marring the sheet is prevented.

Modifications may be resorted to within the spirit and scope of the appended claims.

What I claim is:

1. Apparatus for drawing sheet glass comprising an inclined drawing trough, means to flow molten glass into one end of the trough, and means to draw a sheet of glass substantially horizontally and on edge from said trough.

2. Apparatus for drawing sheet glass comprising an inclined drawing trough, means to flow molten glass into one end of the trough, means to draw a sheet of glass substantially horizontally and on edge from said trough, said drawing means including clamps adapted to grip the upper margin of the sheet, and means to move the clamps in a straight line away from said trough.

3. Apparatus for drawing sheet glass comprising an inclined drawing trough, means to flow molten glass into one end of the trough, means to draw a sheet of glass substantially horizontally and on edge from said trough, said drawing means including clamps adapted to grip the upper margin of the sheet, means to move the clamps in a straight line away from said trough, and means interposed between the clamps and said trough to crimp the upper margin of the sheet preparatory to engagement with said clamps.

4. Apparatus for drawing sheet glass comprising an inclined drawing trough, means to flow molten glass into one end of the trough, means to draw a sheet of glass substantially horizontally and on edge from said trough, said drawing means including clamps adapted to grip the upper margin of the sheet, means to move the clamps in a straight line away from said trough, and an annealing leer thru which said clamps move and carry the sheet of glass.

5. Apparatus for drawing sheet glass comprising an inclined drawing trough, means to flow molten glass into one end of the trough, means to draw a sheet of glass substantially horizontally and on edge from said trough, said drawing means including clamps adapted to grip the upper margin of the sheet, means to move the clamps in a straight line away from said trough, an annealing leer thru which said clamps move and carry the sheet of glass, and means extending in part thru the length of the leer to hold the clamps in supporting and drawing engagement with the sheet of glass.

6. Apparatus for drawing sheet glass comprising an inclined drawing trough, means to flow molten glass into one end of the trough, means to draw a sheet of glass substantially horizontally and on edge from said trough, said drawing means including clamps adapted to grip the upper margin of the sheet, means to move the clamps in a straight line away from said trough, an annealing leer thru which said clamps move and carry the sheet of glass, and means to crimp the upper margin of the sheet preparatory to engagement with the clamps.

7. Apparatus for drawing sheet glass comprising an inclined trough, means to supply molten glass to the trough, means to draw a sheet of glass horizontally and on edge from the trough, and means whereby the angle of inclination of the trough may be varied to thereby in part regulate the thickness of the sheet of glass being drawn.

8. Apparatus for drawing sheet glass comprising an inclined trough, means to supply molten glass to the trough, an annealing leer in proximity to the trough, a series of clamps having irregularly formed gripping faces for engagement with the upper margins of the sheet, means to cause operative engagement between the clamps and opposed faces of the sheet, and means to move the clamps lengthwise of and thru the leer to thereby draw the sheet from said trough and support the former during its travel thru the leer.

9. Apparatus for drawing sheet glass comprising an inclined trough, means to supply molten glass to the trough, an annealing leer in proximity to the trough, a series of clamps having irregularly formed gripping faces for engagement with the upper margins of the sheet, means to cause operative engagement between the clamps and opposed faces of the sheet, means to move the clamps lengthwise of and thru the leer to thereby draw the sheet from said trough and support the former during its travel thru the leer, and means interposed between the leer and trough to shape the upper margins of the sheet to correspond with the shape of the gripping surfaces of the clamps.

10. Apparatus for drawing sheet glass comprising an inclined trough, means to supply molten glass to the trough, an annealing leer in proximity to the trough, a series of clamps having irregularly formed gripping faces for engagement with the upper margins of the sheet, means to cause operative engagement between the clamps and opposed faces of the sheet, means to move the clamps lengthwise of and thru the leer to thereby draw the sheet from said trough and support the former during its travel thru the leer, and means to support the lower margin of the sheet prior to and during movement thereof thru the leer.

11. Apparatus for drawing sheet glass comprising an inclined trough, means to supply molten glass to the trough, an annealing leer in proximity to the trough, a series of clamps having irregularly formed gripping faces for engagement with the upper margins of the sheet, means to cause operative engagement between the clamps and opposed faces of the sheet, means to move the clamps lengthwise of and thru the leer to thereby draw the sheet from said trough and support the former during its travel thru the leer, and means positioned between the trough and leer to cool the opposite surfaces of the sheet prior to entry into the leer.

12. Apparatus for drawing sheet glass comprising a series of inclined troughs, means to constantly deliver molten glass into the upper ends of the troughs, an annealing leer tunnel having its receiving end adjacent said troughs, and means to continuously draw sheets of glass horizontally and on edge from the glass in said troughs and carry the sheets while so positioned thru the leer tunnel.

13. Apparatus for drawing sheet glass comprising an inclined drawing trough including a channel extending lengthwise thereof, means to continuously flow molten glass into and lengthwise of the channel, means to draw a sheet of glass horizontally and on edge from said channel, and means whereby the angle of inclination of the trough may be varied to thereby regulate and control the thickness of the sheet being drawn.

14. Apparatus for drawing sheet glass comprising an inclined drawing trough including a channel extending lengthwise thereof and having its side walls converged toward the lower end, means to continuously supply molten glass to said channel, and means to draw a sheet of glass horizontally and on edge from the glass in said channel.

15. The method of continuously forming sheet glass consisting in flowing molten glass to a drawing trough and drawing a sheet horizontally and on edge from said trough.

16. The method of continuously forming a sheet of glass which consists in supplying molten glass to a drawing trough, continuously drawing a sheet of glass horizontally and on edge from said trough and carrying the sheet in a straight line from the drawing trough to and thru an annealing leer.

17. Apparatus for drawing sheet glass comprising an inclined trough, means to flow molten glass into one end thereof, means to draw a sheet horizontally and on edge from the trough, and cooling means for the opposed vertical faces of the sheet.

18. Apparatus for drawing sheet glass including an inclined drawing trough, means to supply molten glass thereto, and means to draw and support the glass while being annealed, comprising devices contacting only with marginal portions of the sheet.

19. Apparatus for drawing sheet glass including an inclined drawing trough, means to supply molten glass thereto, and means to draw and support the glass while being annealed, comprising devices contacting only with marginal portions of the sheet, said sheet being drawn horizontally and on edge from the trough.

20. Apparatus for forming sheet glass comprising means to contain a supply body of molten glass, means to draw a sheet of glass horizontally and on edge from said body, said means including a device to offset portions of the upper margin of the sheet, and supporting means contacting with opposite sides of the sheet beneath the offset portions.

21. Apparatus for forming sheet glass comprising means to contain a supply body of molten glass, means to draw a sheet of glass horizontally and on edge from said body, said means including a device to offset portions of the upper margin of the sheet, supporting means contacting with opposite sides of the sheet beneath the offset portions, and means to move the supporting means away from the supply body while supporting the sheet.

Signed at Toledo, Ohio, this 19th day of January, 1929.

VICTOR E. HOFMANN.